United States Patent [19]
Lavene

[11] Patent Number: 5,493,472
[45] Date of Patent: Feb. 20, 1996

[54] CAPACITOR MODULE WITH EPOXY HOUSING AND TERMINAL MOUNTING INSERTS

[75] Inventor: Bernard Lavene, Ocean, N.J.

[73] Assignee: Electronic Concepts, Inc., Eatontown, N.J.

[21] Appl. No.: 202,283

[22] Filed: Feb. 25, 1994

[51] Int. Cl.$^6$ .............................. H01G 4/38; H01G 4/228
[52] U.S. Cl. ...................... 361/329; 361/306.1; 361/535; 361/541
[58] Field of Search ................................ 361/271, 299.1, 361/299.2, 299.3, 299.4, 299.5, 306.1, 306.2, 306.3, 307, 308.1, 308.2, 308.3, 309–310, 328–330, 535–539, 541

[56] References Cited

U.S. PATENT DOCUMENTS

| | | |
|---|---|---|
| 1,351,074 | 8/1920 | Thomas . |
| 1,395,931 | 11/1921 | Smith et al. . |
| 1,587,696 | 6/1926 | Carter . |
| 1,710,412 | 4/1929 | Dubilier . |
| 1,717,154 | 6/1929 | Hoover et al. . |
| 1,725,123 | 8/1929 | Bailey . |
| 1,801,050 | 4/1931 | London . |
| 1,881,164 | 10/1932 | Bailey . |
| 2,450,423 | 10/1948 | Fraser et al. . |
| 2,777,976 | 1/1957 | Brafman . |
| 3,011,106 | 11/1961 | Ducati . |
| 3,978,377 | 8/1976 | Constanti . |
| 4,047,790 | 9/1977 | Carino . |
| 4,250,534 | 2/1981 | Brown et al. ........................ 361/308 |
| 4,324,329 | 4/1982 | Tani . |
| 4,464,702 | 8/1984 | Miller et al. . |
| 4,768,129 | 8/1988 | Sasaki et al. ........................ 361/330 |
| 4,814,938 | 3/1989 | Arakawa et al. .................... 361/330 |
| 4,930,045 | 5/1990 | Carlson et al. . |
| 5,142,439 | 8/1992 | Huggett et al. . |

OTHER PUBLICATIONS

Eric Motto, "Power Circuit Design for Third Generation IGBT Modules", *PCIM*, pp. 8, 11–12, 14, 17–18, (Jan. 1994).

*Primary Examiner*—Bot L. Ledynh
*Attorney, Agent, or Firm*—Ratner & Prestia

[57] ABSTRACT

A capacitor module for use with an IGBT including an epoxy housing having two holes completely therethrough. Within the housing are two wound capacitors which are connected in parallel. Additionally, there are two mounting inserts which at least partially line the holes of the housing. The wound capacitors are also connected to the first and second mounting inserts which serve as the terminals for the capacitor module. As a result, the capacitor module exhibits very low self-inductance as well as very low ESR.

11 Claims, 4 Drawing Sheets

5,493,472

CAPACITOR MODULE WITH EPOXY HOUSING AND TERMINAL MOUNTING INSERTS

BACKGROUND OF THE INVENTION

The present invention generally relates to capacitors for use with an Insulated Gate Bipolar Transistor (IGBT) and, more particularly, it relates to a capacitor module designed for direct mounting to an IGBT and a method for making the same.

An IGBT is a device that combines the features of a power transistor and a MOSFET. In particular, an IGBT has the high input impedance and high-speed characteristics of a MOSFET with the conductivity characteristics (low saturation voltage) of a bipolar transistor. See Dorf, *The Electrical Engineering Handbook*, CRC Press (1993), ISBN 0-8493-0185-8.

IGBTs are frequently used for power switching applications. In such applications, snubber circuits are used to "snub out" transient spikes generated by the IGBT when it switches from one state to another. It is known to use leaded capacitors in snubber circuits; however, the leads, which connect the capacitor(s) to the IGBT terminals, generate inductance and equivalent series resistance (ESR). Both of which lead to degraded performance of the snubber circuit and, consequently, degraded switching characteristics for the IGBT.

An additional drawback of using leads to connect capacitor(s) directly to IGBT terminals is uncertain reliability. Because leads are typically fragile and sensitive to vibration, they present a "weak link" in power applications which use IGBTs such as electric vehicles, motor applications, controllers, high power inverters and power conditioning systems.

SUMMARY OF THE INVENTION

The present invention involves a capacitor module including a housing having at least two holes. Within the housing are at least two wound capacitors and, at least partially lining the holes, are first and second mounting inserts. The capacitors are connected in parallel by way of the first and second mounting inserts which serve as the terminals for the capacitor module.

It is to be understood that both the foregoing general description and the following detailed description are exemplary, but are not restrictive, of the invention.

BRIEF DESCRIPTION OF THE DRAWINGS

The invention is best understood from the following detailed description when read in connection with accompanying drawing, in which.

DETAILED DESCRIPTION OF THE INVENTION

Figure 1:
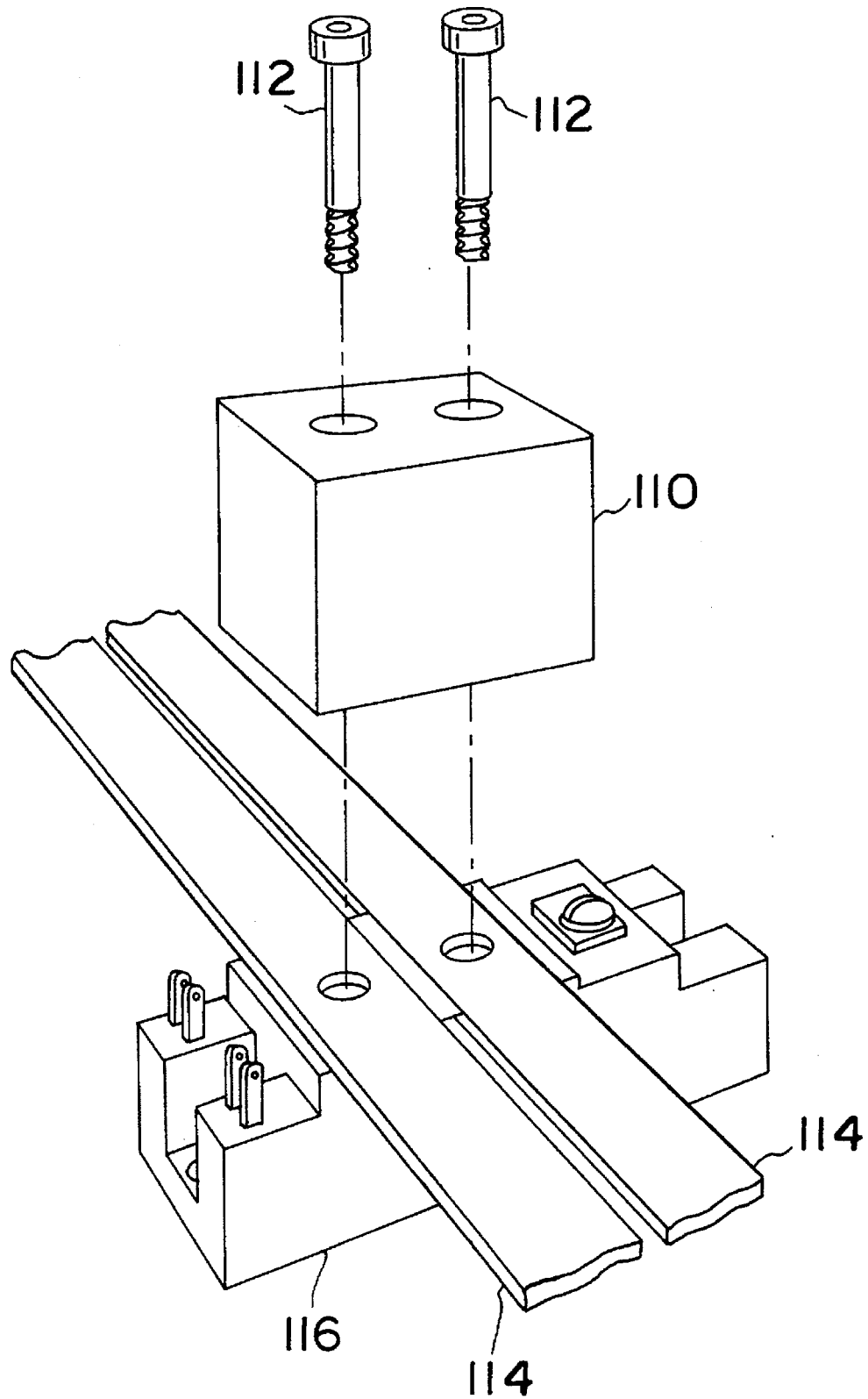
FIG. 1 shows an exemplary embodiment of the present invention being incorporated into an exemplary application.

FIG. 1 shows an exemplary application of the present invention. In FIG. 1, a capacitor module 110 is bolted, via bolts 112, to bus bars 114 and an Insulated-Gate Bipolar Transistor (IGBT) 116. Both the bus bars 114 and IGBT 116 are well known in the art, for example, exemplary bus bars are manufactured by Rogers Corporation of and an exemplary IGBT is manufactured by International Rectifier.

Referring back to FIG. 1, an important purpose of capacitor module 110, in the exemplary application, is to facilitate the operation of IGBT 110 while minimizing inductance and equivalent series resistance (ESR). This purpose is desirably met while, at the same time, satisfying size constraints. Capacitor module 110 facilitates IGBT operation by providing the desired parameters (e.g., capacitance and voltage rating) for snubbing potential spikes during switching of IGBT 116 which, in turn, improves the service life of IGBT 116 and attenuates noise going back into the lines.

Furthermore, capacitor module 110 is able to minimize inductance and ESR by eliminating external leads. In fact, as measured by laboratory experiments, the inductance of capacitor module 110 is approximately 90% less than conventional leaded capacitors for the exemplary application.

Moreover, capacitor module 110 facilitates IGBT installation and assembly by forming a complete subassembly which mounts directly to IGBT 116, thereby reducing assembly time for power supply manufacturers.

Figure 3B:
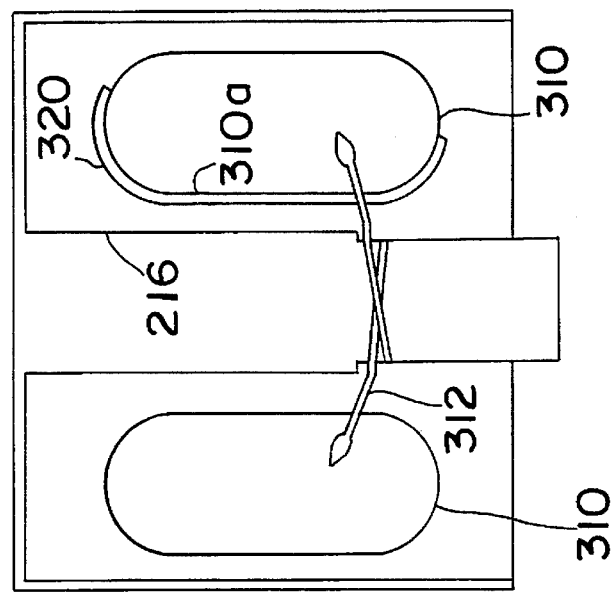
FIG. 3B shows a cut-away side view of FIG. 2B with the capacitors.

In addition to the above advantages, housing the capacitors windings (see FIGS. 3A and 3B) in an epoxy housing, improves flame retardance as well as heat transfer characteristics.

Figure 2B:
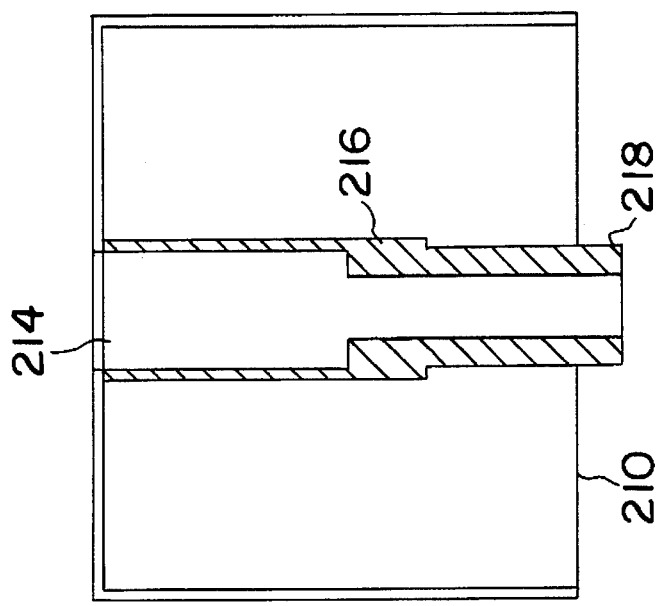
FIG. 2B shows a cut-away side view of the exemplary embodiment of the present invention used in FIG. 1 without the capacitors.
Figure 2A:
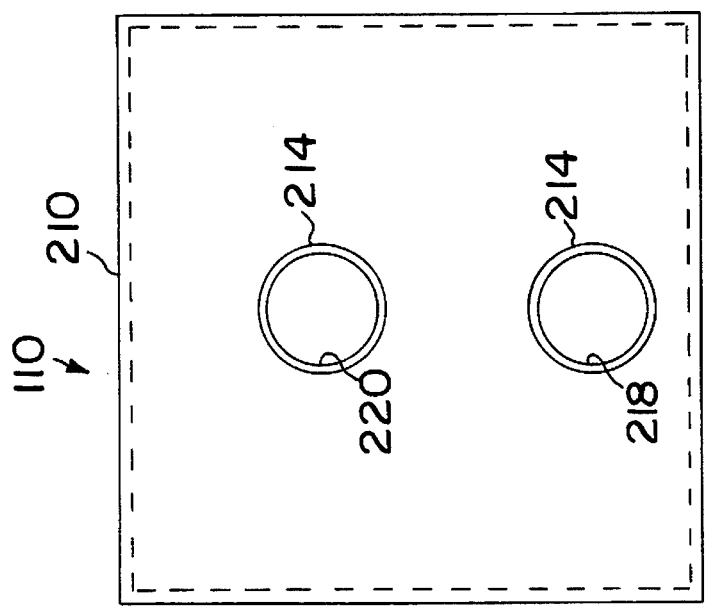
FIG. 2A shows a cut-away top view of the exemplary embodiment of the present invention used in FIG. 1 without the capacitors.

FIGS. 2A and 2B show a cut-away top view and a cut-away side view of capacitor module 110 without the capacitors therein. As shown in FIGS. 2A and 2B, capacitor module 110 includes a housing 210 which houses two capacitors (see FIGS. 3A and 3B) and which has two counter-sunk holes 214 bored all the way through. In the exemplary embodiment, holes 214 are shown in FIG. 2A as off-center in capacitor module 110 due to the spacing requirements of IGBT 116 terminals.

Figure 4A:
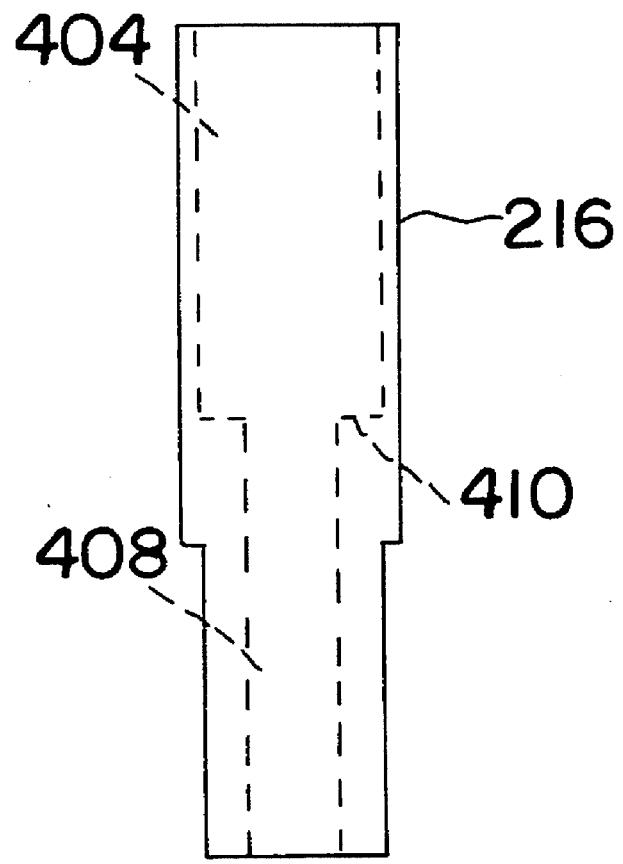
FIG. 4 and 4B shows an exemplary embodiment of a mounting insert used in the embodiment shown in FIGS. 1, 2A, 2B, 3A and 3B.
Figure 4B:
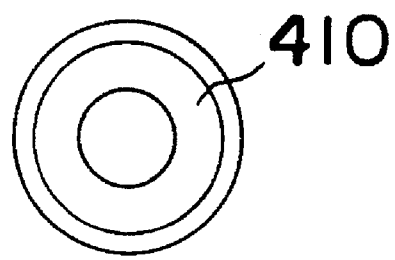

Each hole 214 bored through capacitor module 110 is, at least partially, lined with a conductive terminal mounting insert 216. In an exemplary embodiment of the present invention, as shown in FIG. 4A and 4B, insert 216 includes a wide portion 404 and a narrow portion 408. Lip 410 which transitions mounting insert 216 from wide portion 404 to narrow portion 408 is for the head of bolt 112 to press against in securing capacitor module 110 to bus bars 114 and IGBT 116. Mounting insert 216 is preferably constructed of tin-plated, nickel-coated copper or brass.

Referring back to FIGS. 2A and 2B, mounting inserts 216 are sufficiently spaced and extend beyond a face of housing 210 to provide terminals for connection to IGBT 116. In particular, the center-to-center spacing of inserts 216 substantially match the center-to-center spacing of the terminals for IGBT 116 and each mounting insert 216 protrudes beyond the bottom of housing 210 to form respective terminals: a positive terminal 218 and a negative terminal 220, respectively.

In the preferred embodiment, insert 216 extends approximately 0.25 inches beyond the bottom of housing 210. The two terminals are provided so that bolts 112 can be used to attach capacitor module 110 to IGBT 116. Bolts 112 extend through holes 212 in capacitor module 110, through corresponding holes in bus bars 114 and mate with the terminals of IGBT 116 thus providing a capacitor module subassembly for direct mounting to IGBT 116. Tightening bolts 112 physically secures, as well as electrically connects, capacitor module 110 to bus bars 114 and IGBT 116.

Figure 3A:
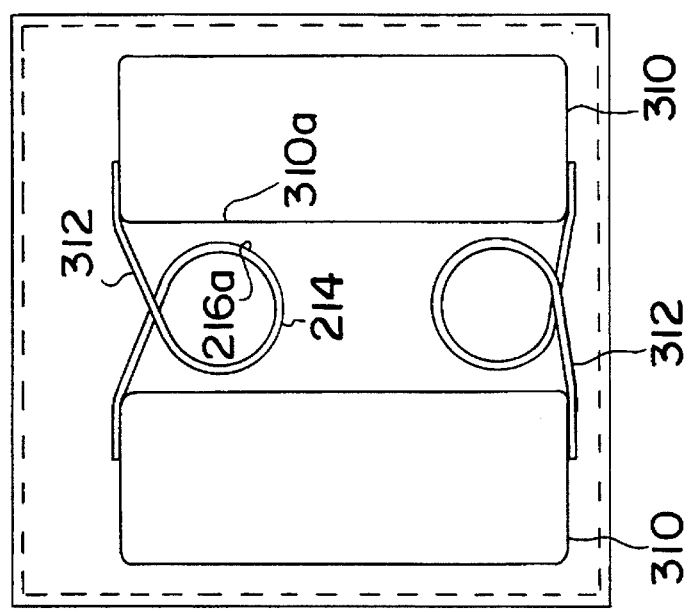
FIG. 3A shows the cut-away top view of FIG. 2A with the capacitors.

FIGS. 3A and 35 show top and side cut-away views with capacitor windings 310 therein. As shown in FIG. 3A, in the exemplary embodiment, each capacitor winding 310 is positioned completely on one side of a plane intersecting mounting inserts 216. In the exemplary embodiment, leads 312 are wrapped around respective mounting inserts 216 and connected to each capacitor winding 310 capacity windings can be connected in with series or parallel. In the exemplary embodiment, leads 312 are constructed of solid copper and soldered to the respective ends of capacitor windings 310. An alternate embodiment of leads 312 comprises a flat copper tab approximately ¼ inch wide and 15–20 mils thick.

As leads 312 are the primary source of inductance, the length of leads 312 are minimized in order to minimize the inductance. Minimizing lead length by extending directly from insert 216 to capacitor windings 310 is particularly important since an additional ¼ inch of lead length could approximately double the inductance. In so doing, each end of capacitor windings 310 are connected to either positive terminal 218 or negative terminal 220.

Wound capacitors for use in capacitor module 110 are well known in the art. An example of a wound capacitor 310 suitable for use with the present invention is found in U.S. Pat. No. 4,470,097 issued to Lavene on Sep. 4, 1984 which is herein incorporated by reference. Additionally, in the exemplary embodiment, capacitors 310 are at least partially covered with an insulating wrap or tape 320 in order to prevent direct contact between the body of a wound capacitor 310a and a portion 216a of mounting insert 216. Once capacitor windings 310 are connected to mounting inserts 216 via leads 312, they are positioned within a hard-casing mold and the mold is filled with an epoxy resin. Then, the epoxy is given time to cure, thereby forming a hard, solid housing for capacitors windings 310 and leads 312.

In the exemplary embodiment of the present invention, the epoxy contains a high alumina content such as substantially pure aluminum oxide. The high alumina content 1) reduces curing time, 2) improves flame retardance and 3) improves heat transfer characteristics. Improved heat transfer characteristics are important because capacitor windings 310 have heat rise which can adversely affect the rms current. In the exemplary embodiment of the present invention, the alumina content is approximately 30%.

The following table lists characteristics for embodiments of the capacitor module manufactured by Electronic Concepts, Inc. in Eatontown, N.J. It should be noted that TS represents the center-to-center distance between mounting inserts 216 and TD represents the wide portion diameter of mounting inserts 216.

TABLE I

| VDC | Cap (uF) | W (mm) | L (mm) | H (mm) | TS (mm) | TD (mm) | ESR (ohms) | 25 C (Arms) | 50 C (Arms) | 85 C (Arms) | I peak $^7$(A) | DVDT (V/us) | ESL (nH) | F res (kHz) |
|---|---|---|---|---|---|---|---|---|---|---|---|---|---|---|
| 400 | 5.0 | 38 | 51 | 24 | 23 | 10 | .005 | 19 | 15 | 9 | 409 | 82 | 23 | 491 |
|  | 10.0 | 38 | 67 | 32 | 23 | 10 | .003 | 28 | 22 | 14 | 817 | 82 | 23 | 347 |
|  | 15.0 | 58 | 72 | 24 | 28 | 14 | .005 | 23 | 19 | 12 | 709 | 47 | 31 | 242 |
|  | 20.0 | 58 | 89 | 25 | 28 | 14 | .004 | 29 | 23 | 14 | 945 | 47 | 31 | 210 |
|  | 25.0 | 58 | 95 | 24 | 28 | 14 | .003 | 33 | 27 | 17 | 1181 | 47 | 31 | 188 |
|  | 30.0 | 58 | 70 | 45 | 28 | 14 | .003 | 37 | 30 | 19 | 1417 | 47 | 31 | 171 |
|  | 50.0 | 63 | 89 | 51 | 28 | 14 | .003 | 45 | 36 | 23 | 2207 | 44 | 32 | 130 |
| 500 | 4.0 | 38 | 51 | 24 | 23 | 10 | .005 | 19 | 15 | 9 | 381 | 95 | 23 | 549 |
|  | 8.0 | 38 | 67 | 32 | 23 | 10 | .003 | 28 | 22 | 14 | 763 | 95 | 23 | 388 |
|  | 12.0 | 58 | 72 | 24 | 28 | 14 | .005 | 23 | 19 | 12 | 661 | 55 | 31 | 271 |
|  | 16.0 | 58 | 89 | 25 | 28 | 14 | .004 | 29 | 23 | 14 | 882 | 55 | 31 | 235 |
|  | 20.0 | 58 | 95 | 24 | 28 | 14 | .004 | 29 | 23 | 14 | 1102 | 55 | 31 | 210 |
|  | 25.0 | 58 | 70 | 45 | 28 | 14 | .003 | 37 | 30 | 19 | 1378 | 55 | 31 | 188 |
|  | 40.0 | 63 | 89 | 51 | 28 | 14 | .003 | 45 | 36 | 23 | 2060 | 51 | 32 | 145 |
| 600 | 3.0 | 38 | 51 | 24 | 23 | 10 | .006 | 17 | 14 | 9 | 327 | 109 | 23 | 634 |
|  | 6.0 | 38 | 67 | 32 | 23 | 10 | .004 | 24 | 19 | 12 | 654 | 109 | 23 | 448 |
|  | 10.0 | 58 | 72 | 24 | 28 | 14 | .005 | 23 | 19 | 12 | 630 | 63 | 31 | 297 |
|  | 12.0 | 58 | 89 | 25 | 28 | 14 | .005 | 26 | 21 | 13 | 756 | 63 | 31 | 271 |
|  | 15.0 | 58 | 95 | 24 | 28 | 14 | .004 | 29 | 23 | 14 | 945 | 63 | 31 | 242 |
|  | 20.0 | 58 | 70 | 45 | 28 | 14 | .003 | 37 | 30 | 19 | 1260 | 63 | 31 | 210 |
|  | 30.0 | 63 | 89 | 51 | 28 | 14 | .003 | 45 | 36 | 23 | 1766 | 59 | 32 | 168 |
| 800 | 2.0 | 38 | 51 | 24 | 23 | 10 | .007 | 16 | 13 | 8 | 272 | 136 | 23 | 777 |
|  | 4.0 | 38 | 67 | 32 | 23 | 10 | .004 | 24 | 19 | 12 | 545 | 136 | 23 | 549 |
|  | 6.0 | 58 | 72 | 24 | 28 | 14 | .006 | 21 | 17 | 11 | 472 | 79 | 31 | 383 |
|  | 8.0 | 58 | 89 | 25 | 28 | 14 | .005 | 26 | 21 | 13 | 630 | 79 | 31 | 332 |
|  | 10.0 | 58 | 95 | 24 | 28 | 14 | .004 | 29 | 23 | 14 | 787 | 79 | 31 | 297 |
|  | 12.0 | 58 | 70 | 45 | 28 | 14 | .004 | 32 | 26 | 16 | 945 | 79 | 31 | 271 |
|  | 20.0 | 63 | 89 | 51 | 28 | 14 | .003 | 45 | 36 | 23 | 1471 | 74 | 32 | 205 |
| 1200 | .68 | 38 | 51 | 24 | 23 | 10 | .005 | 19 | 15 | 9 | 352 | 517 | 23 | 1389 |
|  | 1.5 | 38 | 67 | 32 | 23 | 10 | .003 | 28 | 22 | 14 | 776 | 517 | 23 | 935 |
|  | 2.2 | 58 | 72 | 24 | 28 | 14 | .005 | 23 | 19 | 12 | 596 | 271 | 31 | 647 |
|  | 3.0 | 58 | 89 | 25 | 28 | 14 | .004 | 29 | 23 | 14 | 813 | 271 | 31 | 554 |
|  | 3.5 | 58 | 95 | 24 | 28 | 14 | .004 | 29 | 23 | 14 | 948 | 271 | 31 | 513 |
|  | 4.0 | 58 | 70 | 45 | 28 | 14 | .004 | 32 | 26 | 16 | 1083 | 271 | 31 | 480 |
|  | 6.8 | 63 | 89 | 51 | 28 | 14 | .003 | 45 | 36 | 23 | 1682 | 247 | 32 | 358 |
| 1500 | .56 | 38 | 51 | 24 | 23 | 10 | .006 | 17 | 14 | 9 | 326 | 582 | 23 | 1530 |
|  | 1.2 | 38 | 67 | 32 | 23 | 10 | .003 | 28 | 22 | 14 | 698 | 582 | 23 | 1045 |

TABLE I-continued

| VDC | Cap (uF) | W (mm) | L (mm) | H (mm) | TS (mm) | TD (mm) | ESR (ohms) | 25 C (Arms) | 50 C (Arms) | 85 C (Arms) | I peak [7](A) | DVDT (V/us) | ESL (nH) | F res (kHz) |
|---|---|---|---|---|---|---|---|---|---|---|---|---|---|---|
|  | 2.0 | 58 | 72 | 24 | 28 | 14 | .005 | 23 | 19 | 12 | 609 | 305 | 31 | 679 |
|  | 2.5 | 58 | 89 | 25 | 28 | 14 | .004 | 29 | 23 | 14 | 762 | 305 | 31 | 607 |
|  | 3.0 | 58 | 95 | 24 | 28 | 14 | .004 | 29 | 23 | 14 | 914 | 305 | 31 | 554 |
|  | 3.5 | 58 | 70 | 45 | 28 | 14 | .004 | 32 | 26 | 16 | 1067 | 305 | 31 | 513 |
|  | 5.6 | 63 | 89 | 51 | 28 | 14 | .003 | 45 | 36 | 23 | 1558 | 278 | 32 | 394 |

Furthermore, in the preferred embodiment, the hard-casing mold is constructed of DAP and the epoxy is a two-part epoxy product by Ciba Geigy.

Although the invention is illustrated and described herein as embodied in a capacitor module with an epoxy case and designed for terminal mounting, the invention is nevertheless not intended to be limited to the details shown. Rather, various modifications may be made in the details within the scope and range of equivalents of the claims and without departing from the spirit of the invention.

What is claimed:

1. A capacitor module for use with a power transistor comprising:

a housing having at least two holes completely therethrough;

at least two wound capacitors enclosed within the housing; and first and second mounting inserts at least partially lining the holes, the capacitors being connected in parallel, by way of connections internal to the housing, to the first and second mounting inserts, wherein the first and second mounting inserts are adapted for connection to the power transistor.

2. The capacitor module of claim 1, wherein said housing is constructed from epoxy.

3. The capacitor module of claim 2, wherein said epoxy has a high alumina content for improvement of curing time, flame retardance and heat transfer characteristics.

4. The capacitor module of claim 1, wherein said mounting inserts extend beyond said housing for connection to the power transistor.

5. The capacitor module of claim 4, wherein said mounting inserts are constructed of tin-plated, nickel-coated copper.

6. The capacitor module of claim 1, wherein said capacitors are connected to said mounting inserts via leads.

7. The capacitor module of claim 6, wherein said leads are wound around said mounting inserts and minimized in length.

8. The capacitor module of claim 1, wherein said capacitors include an insulating wrap to insulate them from said mounting inserts.

9. The capacitor module of claim 1, wherein said mounting inserts only partially line the holes in said housing.

10. The capacitor module of claim 1, wherein said mounting inserts completely line the holes in said housing.

11. A capacitor module for use with an insulated-gate bipolar transistor (IGBT) comprising:

a housing having at least two holes completely therethrough;

first and second mounting inserts at least partially lining said holes, the mounting inserts sufficiently spaced, and extending beyond a face of the housing, to provide terminals for connection to the IGBT; and at least two wound capacitors enclosed within the housing, each capacitor positioned completely on one side of a plane intersecting the first and second mounting inserts, the capacitors being connected in parallel by leads connected to the first and second mounting inserts.

* * * * *